US007165880B2

(12) United States Patent
Albright

(10) Patent No.: US 7,165,880 B2
(45) Date of Patent: Jan. 23, 2007

(54) MIXING APPARATUS WITH NON-SYMMETRICAL SIDES

(75) Inventor: Christopher Albright, Brodhead, WI (US)

(73) Assignee: Kuhn Knight Inc., Brodhead, WI (US)

( * ) Notice: Subject to any disclaimer, the term of this patent is extended or adjusted under 35 U.S.C. 154(b) by 197 days.

(21) Appl. No.: 10/713,045

(22) Filed: Nov. 17, 2003

(65) Prior Publication Data

US 2005/0105390 A1    May 19, 2005

(51) Int. Cl.
*B01F 7/24* (2006.01)
(52) U.S. Cl. ...................................... 366/314; 366/603
(58) Field of Classification Search ................ 366/314, 366/318–324, 603; 241/101.761, 605
See application file for complete search history.

(56) References Cited

U.S. PATENT DOCUMENTS

| | | | | |
|---|---|---|---|---|
| 1,930,948 | A | * | 10/1933 | Brewer ........................ 366/314 |
| 2,894,733 | A | * | 7/1959 | Wosmek ................... 366/183.2 |
| 2,896,923 | A | * | 7/1959 | Luscombe ................... 366/186 |
| 3,021,121 | A | * | 2/1962 | Moss et al. ............... 366/157.1 |
| 3,667,734 | A | * | 6/1972 | Skromme et al. ........... 366/266 |
| 4,439,044 | A | * | 3/1984 | Buttiker ....................... 366/292 |
| 4,761,076 | A | * | 8/1988 | Witcombe .................... 366/46 |
| 6,409,376 | B1 | * | 6/2002 | Knight ........................ 366/141 |

FOREIGN PATENT DOCUMENTS

| EP | 0 706 755 A1 | * | 4/1996 |
|---|---|---|---|
| EP | 0 779 027 A2 | * | 6/1997 |
| EP | 0 985 342 A2 | * | 3/2000 |

OTHER PUBLICATIONS

Information related to competitor's products, Oct. 2, 2003.

* cited by examiner

*Primary Examiner*—David Sorkin
(74) *Attorney, Agent, or Firm*—Oblon, Spivak, McClelland, Maier & Neustadt, P.C.

(57) ABSTRACT

A mixing apparatus is disclosed for mixing and discharging livestock feed. The mixer includes a container for the reception of feed, with a floor and a wall extending away from the floor such that substantially all of the wall is disposed above the floor. The wall and floor define an enclosure for the feed received through the top opening. An auger is disposed within the enclosure, and the auger has an axis of rotation extending substantially vertically through the floor. The wall also includes a first side and a second side positioned on opposing sides of the enclosure, each of the sides being disposed at dissimilar angles relative to the floor. An undercarriage includes a hitch which is offset from the centerline of the floor in the direction of travel.

19 Claims, 6 Drawing Sheets

Section A-A

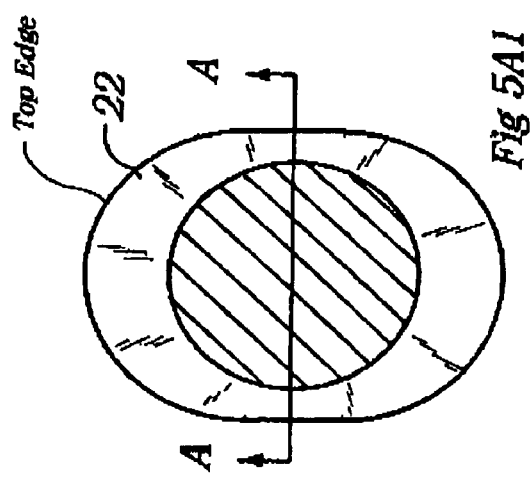
*Fig 5A1*
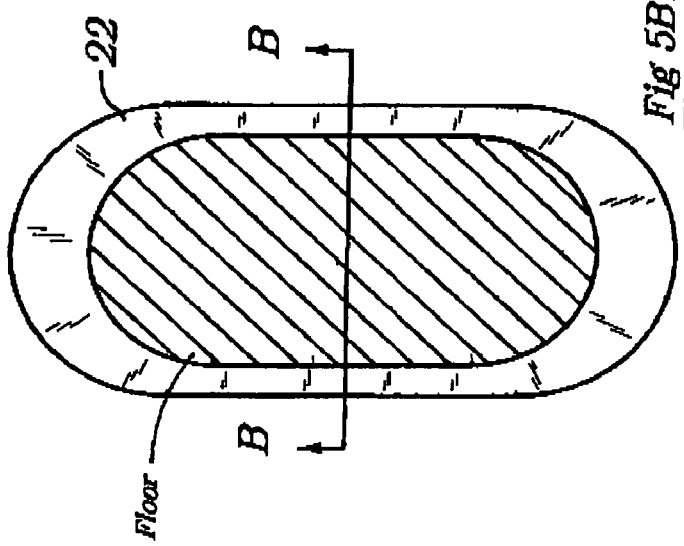
*Fig 5B1*
Top View
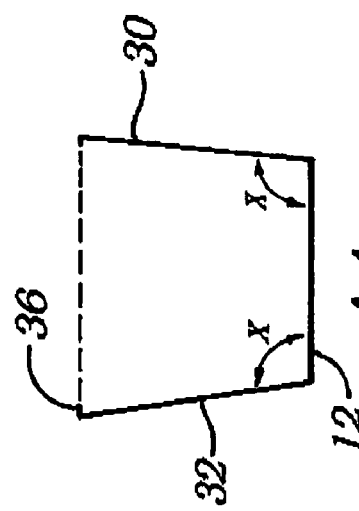
*Fig 5A2*
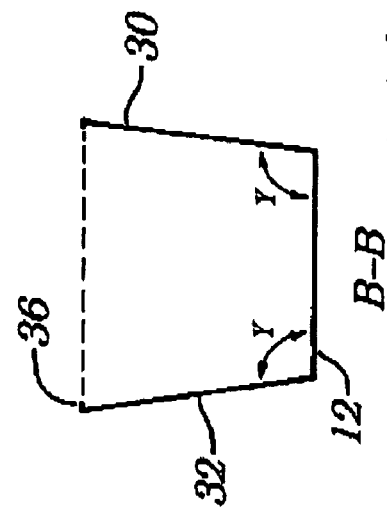
*Fig 5B2*

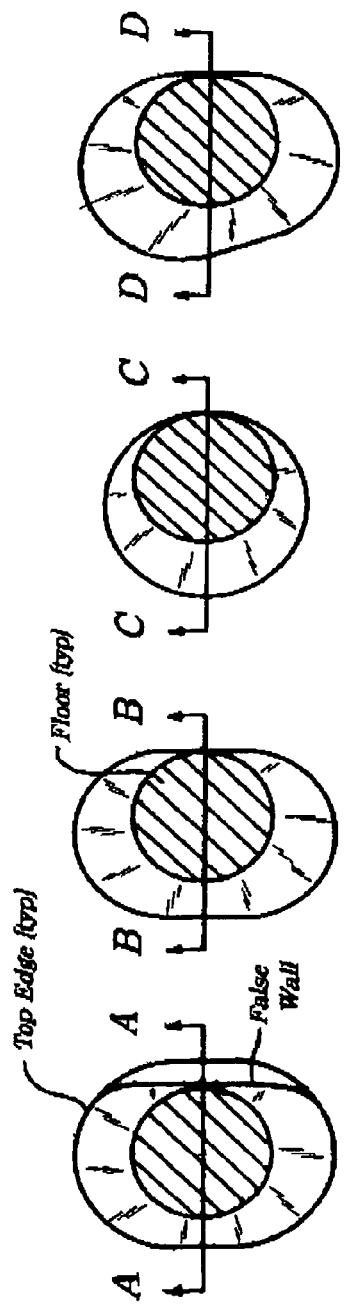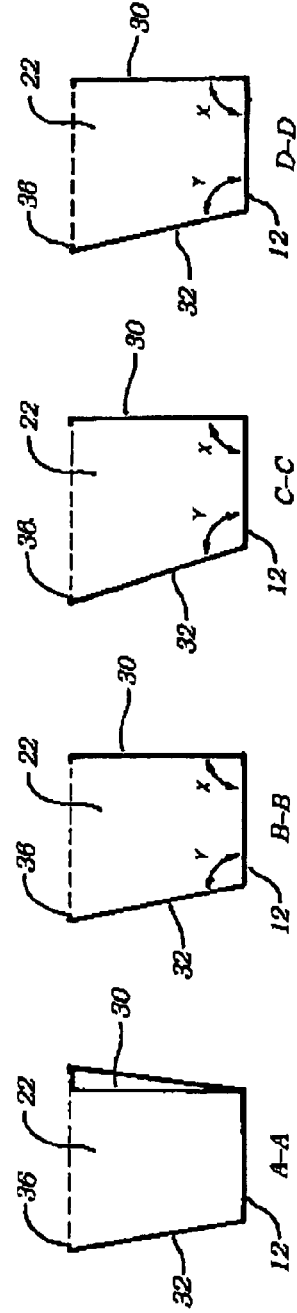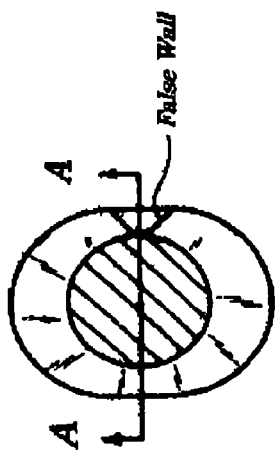

MIXING APPARATUS WITH NON-SYMMETRICAL SIDES

CROSS-REFERENCE TO RELATED APPLICATIONS

None

BACKGROUND OF THE INVENTION

1. Field of the Invention

This invention relates to the container body for agricultural mixers, specifically vertical type feed mixers.

2. Background of the Invention

Agricultural mixers are used for mixing feed materials such as hay, silage and other nutrients including animal feed supplements and grains. These feed materials are then discharged and fed to various livestock such as cattle and dairy cows. Sometimes the mixing of such feed includes depositing a whole round or square bale of hay into the mixer. The mixer then cuts and processes the bale into the desired consistency before and during the mixing of the other feed nutrients.

In known mixers, there are many different configurations including horizontal augers, reel type arrangements, and vertical augers. In the vertical auger type mixers, the auger and container body designs are generally similar. The auger design generally includes a center core on a vertical axis, with helical auger flighting wrapped around this core. The auger flighting has an overall conical appearance, being wider at the base and narrower at the top. The flighting can also include individual paddles or segmented flighting sections oriented in a helical pattern to urge the material in the desired direction. Knives are added to the flighting to help cut and process the feed materials.

The container body designs include a horizontal floor, which closely approximates the diameter of the vertical auger at its base. Walls extend upward from the floor to form a container with an open top, so that feed materials can be loaded from above.

The walls of the container are in the shape of an inverted frustum, being wider at the top and narrower at the base. However, the walls on the sides of the container are typically arranged at a steeper angle in comparison to the walls on the ends of the container. The resulting container shape is that of a flexible plastic bowl with a flat bottom, being squeezed in at the top edge along two opposing sides. The reasons for this shape in vertical mixers is both to narrow the overall profile of the container, and to facilitate feed processing inside the mixer. A similar shape is utilized in the case of multiple auger mixers, with the frustum shape being stretched to accommodate the additional augers.

The oblong shape of the vertical mixer container at the top edge, combined with the cone shape of the auger, creates a wide cavity for the reception of feed at the ends of the container, and a narrower cavity at the sides of the container. During the mixing of feed inside the container, the auger rotates at a constant speed, urging the feed materials around the inside circumference of the container. When the feed encounters the narrower cavities at the sides, a restriction point is created, thus forcing a mixing action as well as allowing the auger knives to further cut or process the feed materials. As the feed moves into the wider cavities at the ends of the container, the feed increases in velocity and falls down into the cavity. The resulting rotary motion of the feed is that of alternating restriction and release, slow and fast, rising and falling movement, which causes the mixing and processing of the materials.

A discharge opening is typically located at the lower edge of the container wall to discharge the feed materials after mixing. The most efficient location for discharging materials is at the ends of the container, where the cavities are larger and the feed flows better and thus discharges more freely. Once discharged at the end of the container, the feed must be moved to the side of the container where it is normally unloaded. This requires a long discharge chute to carry the feed materials from the front or rear of the container to the side of the container. An alternative is to have a discharge opening on the side of the container, but this restriction point typically has more pressure and binding of the feed, and is less desirable than a discharge opening on the ends of the container.

When a full load of feed is circulating inside the container, a common problem is spilling and feed retention. When the feed is restricted at the sides of the container, it tends to lift the feed and spill over the edges. Manufacturers have devised several methods of retaining the feed inside the container, including chains, pipes, plastic or other structural components, which must be attached at both sides of the container.

In vertical mixers in which the sides of the container are symmetrical, one disadvantage is that the feed is restricted in two places along the inside circumference of the container. This redundant action slows the mixing action twice per revolution.

Another disadvantage of symmetrical container sides with two restriction points is that it creates spilling of feed on both sides of the mixer, generally requiring two sets of feed retention devices to be installed.

Another disadvantage of symmetrical container sides is that additional horsepower is required for the auger knives to cut and process the feed materials on both restrictive sides of the container at the same time.

Another disadvantage of symmetrical container sides is that the discharge opening is placed on the container ends for the best discharging efficiency, requiring the use of a long conveyor to reach the sides of the machine for unloading.

Another disadvantage of symmetrical container sides is that the tongue and hitch is normally centered on the container. With the discharge chute extended to the side for unloading, the discharging feed extends a greater distance from the centerline of the towing vehicle. This forces the towing vehicle to travel off-center when discharging feed materials, and makes it more difficult for the operator to view the discharge progress during the unloading operation of the mixer.

SUMMARY OF THE INVENTION

Accordingly, one objective of the present invention is to provide a vertical mixer with non-symmetrical sides, which addresses problems associated with known devices used for mixing feed materials. Moreover, depending on the embodiment of the invention, one or more of the capabilities set forth below may be achieved:

providing a mixer which has only a single restriction point to reduce the mixing time required;

providing a mixer which has only a single restriction point to reduce the total horsepower required;

providing a mixer which reduces the amount of feed spilling over the sides of the container;

providing a mixer which utilizes a side discharge opening which does not coincide with a restriction point in the container;

providing a mixer which utilizes a side discharge opening positioned on the side without the restriction point, but adjacent to the end which is in the direction opposite of the direction of rotation of the auger;

providing a mixer with one relatively vertical side, to assist the loading of the mixer with a skidsteer or loader tractor;

providing a mixer with an offcenter hitch, to allow additional clearance for a side discharge chute in a confined feed alley, and improving the operator's visibility of the feed discharge area; and providing a mixer with increased cutting and processing ability, due to the close proximity of one of the container sides to the auger.

BRIEF DESCRIPTION OF THE DRAWINGS

These and other advantages of the invention will become more apparent and more readily appreciated from the following detailed description of the exemplary embodiments of the invention taken in conjunction with the accompanying drawings, where.

Figure 1:
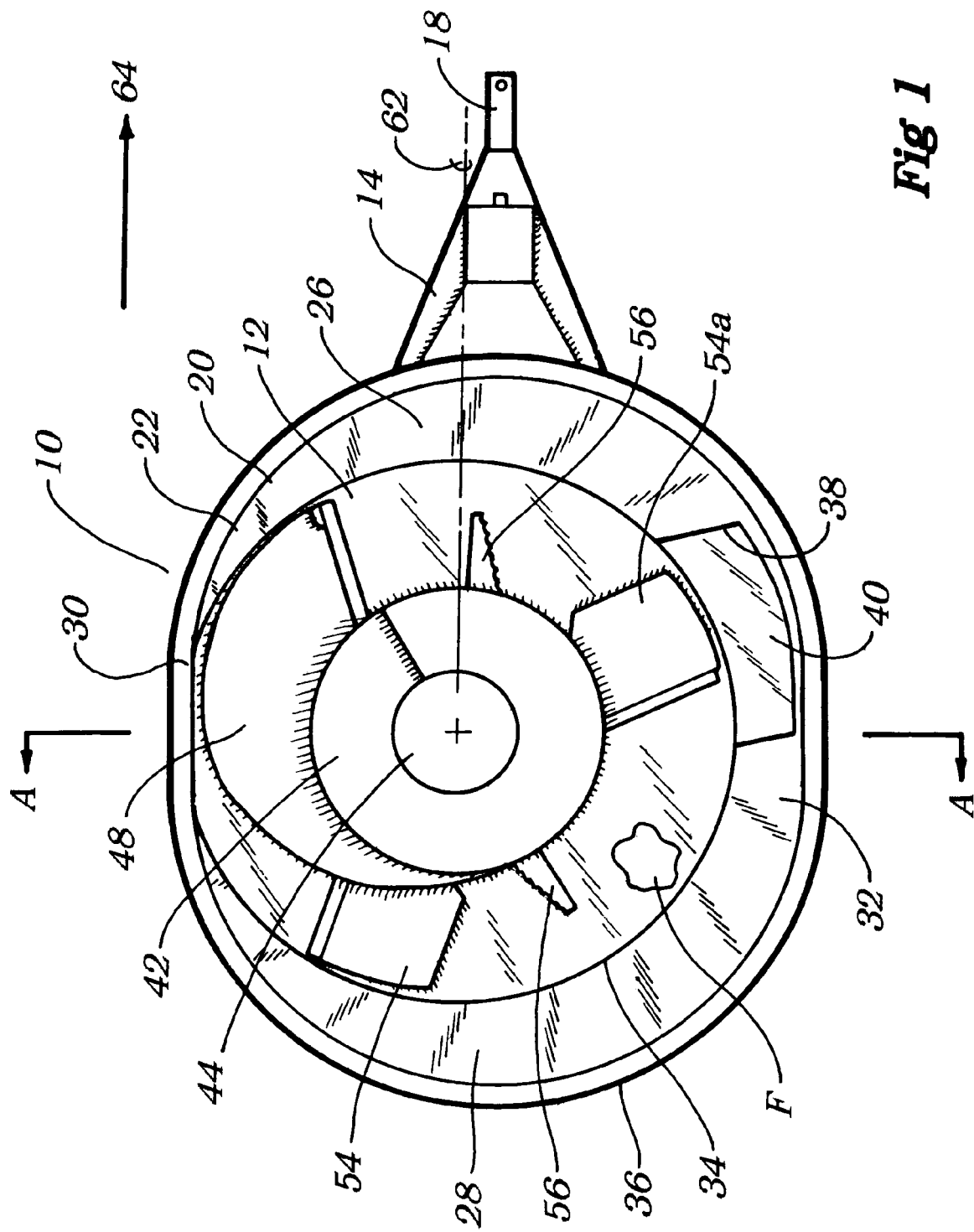
FIG. 1 is a top view of an exemplary embodiment of a mixer apparatus according to the invention.
Figure 2:
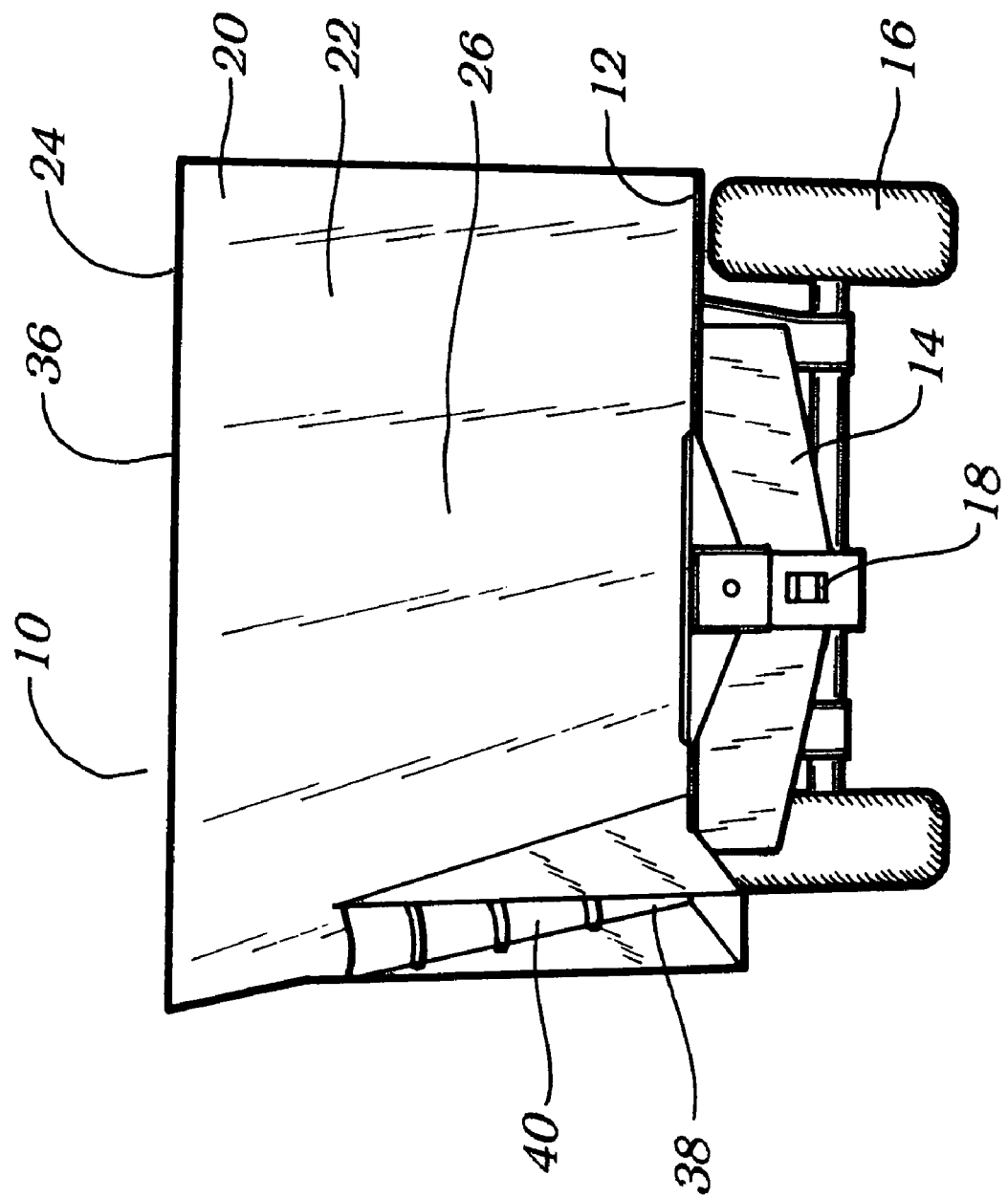
FIG. 2 is a front view of the mixer apparatus of FIG. 1.
Figure 3:
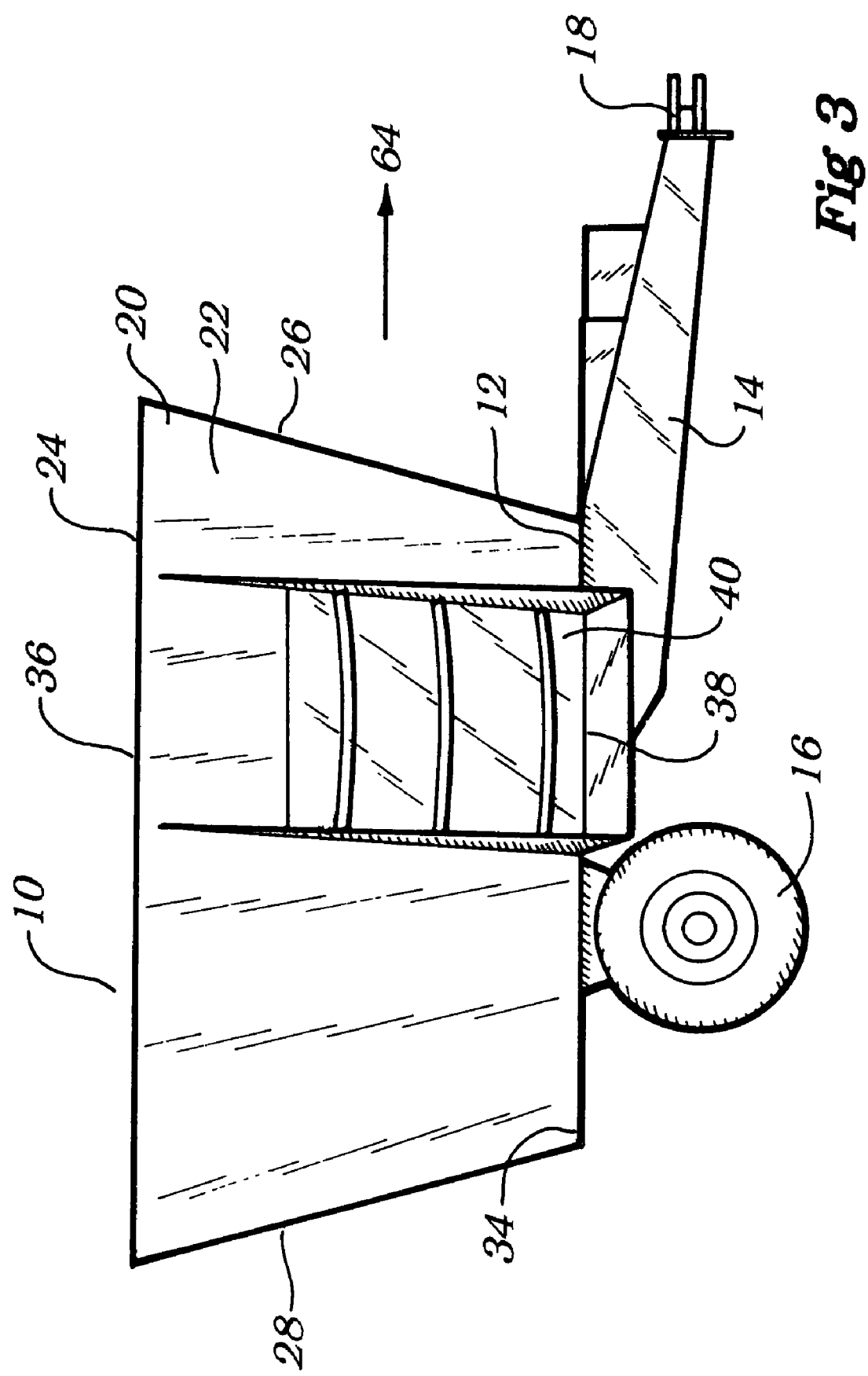
FIG. 3 is a side view of the mixer apparatus of FIG. 1.

FIG. $5A_1$ is a top view of a known vertical mixer apparatus;

FIG. $5A_2$ is a sectional view of the mixer apparatus of FIG. $5A_1$;

FIG. $5B_1$ is a top view of a known vertical mixer apparatus;

FIG. $5B_2$ is a sectional view of the mixer apparatus of FIG. 5A1;

FIGS. $6A_1$, $6A_3$, $6B_1$, $6C_1$, and $6D_1$ are top views of various configurations of mixer apparatuses according to the present invention; and FIGS. $6A_2$, $6B_2$, $6C_2$, and $6D_2$ are sectional views of the mixer apparatuses of FIGS. $6A_1$, $6B_1$, $6C_1$, and $6D_1$, respectively.

DETAILED DESCRIPTION OF THE DRAWINGS

With reference to FIGS. 1–4, a mixer apparatus is generally designated by the reference number 10. The mixer 10 includes a floor 12 which is attached to an undercarriage 14. The undercarriage 14 can be mounted in a stationary position or on a truck chassis, but is most often mounted on a set of wheels 16 with a hitch 18 for towing the mixer apparatus. A wall 20 is attached to the floor 12, and extends upward from the floor 12 to form an enclosure 22 for the reception of feed through the top opening 24. The wall 20 includes a first end 26, a second end 28, a first side 30 and a second side 32. The wall 20 also has a bottom edge 34 adjacent to the floor 12, and a top edge 36 adjacent to the top opening 24. A discharge opening 38 is located adjacent to the bottom edge 34 of the wall 20 for discharge of feed materials after mixing. A door 40 is movably positioned adjacent to the discharge opening 38 so that the discharge opening can be closed while mixing and opened for discharging feed materials.

An auger 42 is positioned inside the enclosure 22 adjacent to the floor 12. The auger 42 includes a core 44 with an axis of rotation 46 extending approximately perpendicular through the floor 12. The auger 42 can be rotated around the axis of rotation 46 in the direction of rotation 47 by a tractor vehicle by means of transmission shafts and gear wheels located under the floor 12. The auger 42 also includes flighting 48 attached to the core 44 in a spiral configuration, including lower flighting 50 adjacent to the bottom edge 34 and upper flighting adjacent to the top edge 36 of the wall 20. The lower flighting 50 is larger in diameter than the upper flighting 52, so that the overall shape of the auger 42 is conical, being wider at the bottom edge 34 of the of the wall 20 and narrower toward the top edge 36 of the wall 20. The lower flighting 50 may also include a paddle 54 and a further paddle 54a which assist in feed movement. The flighting 48 includes a plurality of knives 56 which cooperate with the wall 20 to cut and process the feed material.

FIG. 1 also shows a floor centerline 62 which is a horizontal line intersecting the center point of the floor 12, parallel to the direction of travel 64. The hitch 18 is normally aligned off-center to the floor centerline 62 in the direction of the discharge opening 38, to attain improved alignment for the towing vehicle during discharge of the feed material F.

Figure 4:
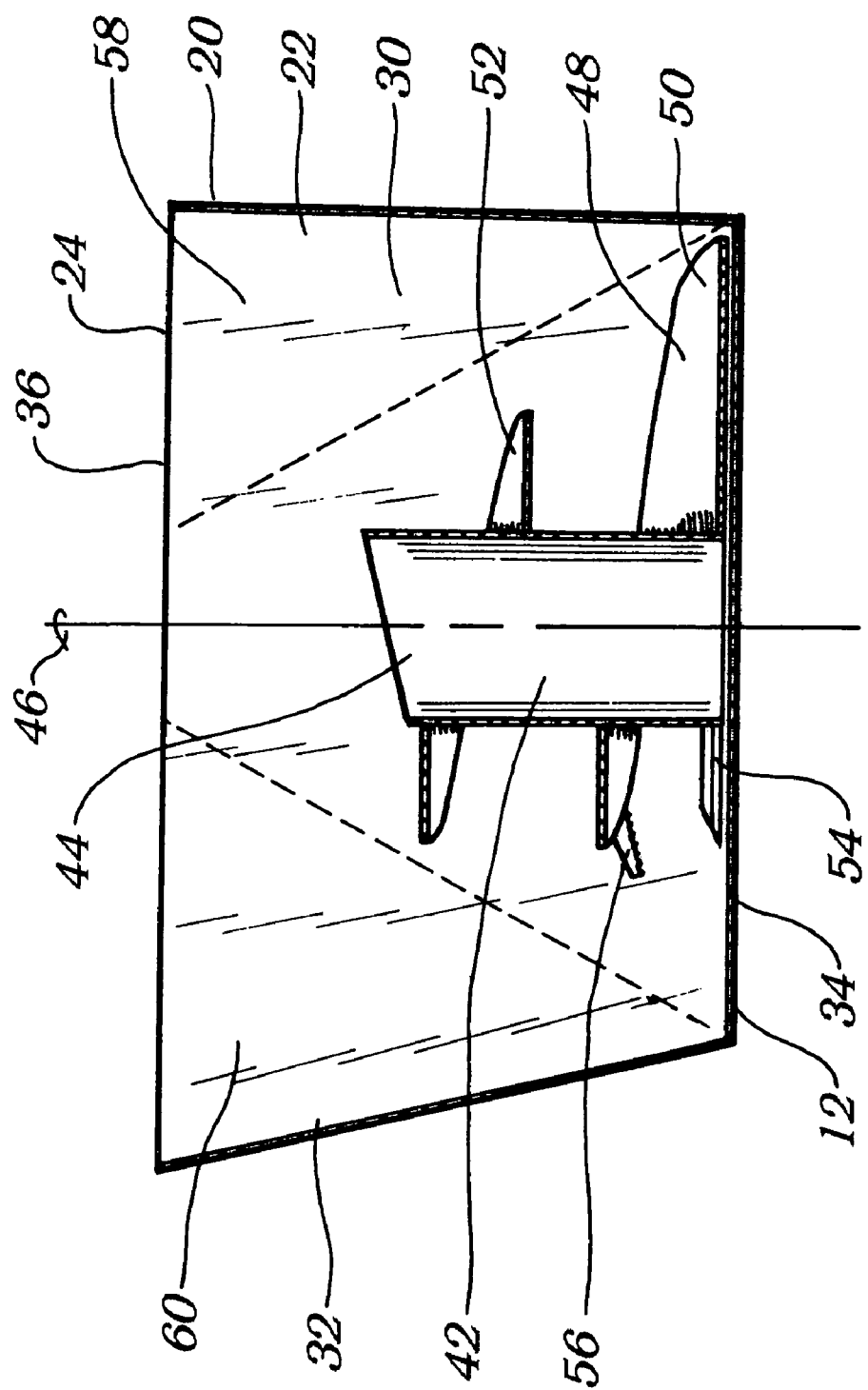
FIG. 4 is a section view of the apparatus of FIG. 1.

In the embodiment shown in FIG. 4, the first side 30 of the wall 20 is disposed substantially vertically (i.e., perpendicular to the floor 12), while the second side 32 of the wall 20 is disposed at an angle greater than 90 degrees to the floor 12. In such a case, substantially vertically means at 90 degrees+/−5 degrees relative to the floor 12. These differing angles create a first mixing zone 58 between the first side 30 and the flighting 48, and a second mixing zone 60 between the second side 32 and the flighting 48 in the enclosure 22. The resulting distance between the knives 56 and the first side 30 in the first mixing zone 58 is shorter and thus more restrictive than the distance between the knives 56 and the second side 32 of the second mixing zone 60.

FIGS. $5A_1$ and $5A_2$ show a top view and a section view of a known vertical mixer apparatus using a single vertical auger. Section A—A of a known mixing apparatus enclosure 22 shows the first side 30 and the second side 32 being disposed at the same angle (labeled "x") relative to the floor 12. Similarly, FIGS. $5B_1$ and $5B_2$ show a top view and a section view of a known vertical mixer apparatus using plural vertical augers. Section B—B of a known mixing apparatus enclosure 22 shows the first side 30 and the second side 32 being disposed at the same angle (labeled "y") relative to the floor 12.

By contrast, FIG. $6A_1$ shows an embodiment of the mixer apparatus enclosure 22 of the present invention with the first side 30 being substantially vertical relative to the floor 12, and the second side 32 being at a greater angle relative to the floor 12. In this embodiment, the first side 30 is created by adding a false wall to a known mixer apparatus, such as that of FIG. $5A_1$. In such an embodiment, the size and/or shape of the auger normally used in the known mixer apparatus may need to be reduced or changed in order to allow the auger to rotate properly within the enclosure. The false wall also need not extend the entire length of the enclosure but may instead run only a portion of the side. Similarly, other one or more constriction points may be placed on a side wall such that the pressure is substantially higher at points on one wall (e.g., side wall 30) as compared to corresponding points on the opposing wall (e.g., side wall 32), such as is shown in FIG. $6A_3$. These constriction points need not run the entire height of the enclosure 22. One example of such a constriction point is a wedge shape running vertically within the enclosure such that the constriction point is relatively compact and easy to install in an existing apparatus.

Section B—B shows another embodiment of the present invention having an oblong-shaped mixer apparatus enclosure 22 with the first side 30 being substantially vertical relative to the floor 12 (i.e., having an angle labeled "x" substantially close to 90), and the second side 32 being at a greater angle (labeled "y") relative to the floor 12. As would be appreciated by one of ordinary skill in the art, the angle "x" may be either slightly greater than or slightly less than 90 degrees. Preferably the absolute value of the difference between the angles x and y is between 5 and 30 degrees, with preferable sub-ranges of 5 to 15 degrees. In such embodiments, the auger need not be centered within the enclosure but may instead be off center. Such an embodiment may also be described in terms of a relative distance between the center of rotation of the auger and the bottom of the side walls of the apparatus. In one such embodiment, the distance between the center of rotation of the auger and the bottom of the side wall 30 is 0.5 to 5 percent less than the distance between the center of rotation of the auger and the bottom of the side wall 32. Preferably the distance is 0.5 to 2% less.

Section C—C shows another embodiment of the present invention having a substantially circular-shaped mixer apparatus enclosure 22 with the first side 30 being substantially vertical relative to the floor 12 (i.e., having an angle labeled "x" substantially close to 90), and the second side 32 being at a greater angle (labeled "y") relative to the floor 12. The selection of angles for x and y are described above with respect to FIGS. 6B$_1$ and 6B$_2$.

Section D—D shows another embodiment of the present invention having an asymmetrically shaped mixer apparatus enclosure 22 with the first side 30 being substantially vertical relative to the floor 12 (i.e., having an angle labeled "x" substantially close to 90), and the second side 32 being at a greater angle (labeled "y") relative to the floor 12. The selection of angles for x and y are described above with respect to FIGS. 6B$_1$ and 6B$_2$. In this embodiment, the first side 30 and the second side 32 are not parallel to each other.

Other configurations of mixer apparatuses are also possible, such as V-shaped configurations similar to FIG. 6B$_1$ except that the width of the top or front wall is smaller than the width of the opposite back or rear wall (i.e., as if the rear wall was pinched to be smaller than the front wall). It is then possible to place the discharge unit on the sidewall at a point of lower pressure after the smallest distance between the auger and walls.

Operation

Referring to FIG. 4, in the operation of the mixing apparatus (10), feed materials (F) such as hay, forages, and grains are loaded into the mixer through the top opening (24). Often these materials include long stemmed hay, either in square or round bales. The mixer is typically powered by a tractor (not shown), which rotates the auger (42) inside the mixer. The auger 42 and flighting 48 is arranged so that when the auger 42 is rotated around the axis of rotation 46 in the direction of rotation 47, the lower flighting 50 sweeps the feed materials (F) from the floor 12 upwards toward the upper flighting 52. When the feed material (F) reaches the top of the upper flighting 52, it begins to fall back into the enclosure 20 for further mixing. The feed material (F) is also carried in a circular motion around the perimeter of the enclosure due to the rotary movement of the auger 42 around the axis of rotation 46 in the direction of rotation 47. When the feed material (F) in rotary motion encounters the first mixing zone 58, it is restricted due to relatively short distance between the knives 56 and the first side 30. This restriction causes the feed material (F) to be cut and processed by the knives before being forced through by additional feed materials from behind.

As the feed material (F) continues around the enclosure 22, it encounters much less resistance as it reaches the second mixing zone 60 due to the longer distance between the knives 56 and the second side 32. Likewise, there is very little resistance for rotary feed material (F) movement when passing adjacent to the first end 26 and the second end 28 of the wall 20 because of the long distance between the knives 56 and the ends 26 and 28. Once the feed materials (F) are thoroughly mixed, the door (40) is opened and the feed material (F) is discharged out of the mixer for distribution to the intended livestock. Alternative mixing apparatus configurations often includes two or more augers inside the enclosure, which function in similar fashion to the operation described herein.

Alternate embodiments of the present invention are also possible, and the above specification is not intended as a limitation on the scope of the present invention.

The invention claimed is:

1. A mixing apparatus for mixing livestock feed, said apparatus comprising:
   a container configured to be pulled in a direction of travel and to receive feed;
   said container including:
   a floor,
   a wall extending away from said floor, such that substantially all of said wall is disposed above said floor, said wall defining a top opening disposed remote from said floor for the reception therethrough of the feed, said floor and said wall defining therebetween an enclosure for the feed received through the top opening;
   a discharge opening in said wall; and
   an auger disposed within said enclosure, said auger having an axis of rotation extending substantially vertically through the floor,
   said wall further including a first side and a second side positioned on opposing sides of the enclosure, said first side and said second side being disposed substantially parallel to the direction of travel of the mixing apparatus,
   each of said sides being disposed at dissimilar angles relative to said floor,
   wherein said first side is disposed substantially vertical relative to said floor,
   wherein the discharge opening is disposed in said second side.

2. The mixing apparatus of claim 1 wherein said first side and said second side are not symmetrical.

3. The mixing apparatus of claim 1, wherein an absolute value of a difference between the angles of the first and second sides comprises a range of 10 to 30 degrees.

4. The mixing apparatus of claim 3, wherein the range comprises 15 to 25 degrees.

5. The mixing apparatus of claim 1, wherein said first side is disposed vertical relative to said floor.

6. The mixing apparatus of claim 1, wherein said first side and said second side are disposed parallel to a direction of travel of the mixing apparatus.

7. A mixing apparatus for mixing livestock feed, said apparatus comprising:
   a container for the reception of feed;

said container including:
  a floor,
  a wall extending away from said floor, such that substantially all of said wall is disposed above said floor, said wall defining a top opening disposed remote from said floor for the reception therethrough of the feed, said floor and said wall defining therebetween an enclosure for the feed received through the top opening;
  an auger disposed within said enclosure, said auger having an axis of rotation extending substantially vertically through the floor,
  said wall further including a first side and a second side positioned on opposing sides of the enclosure, each of said sides being disposed at dissimilar angles relative to said floor;
the mixing apparatus further comprising an undercarriage disposed adjacent and underneath said floor,
said undercarriage including;
  a hitch,
  a set of wheels,
  a floor centerline parallel to a direction of travel of said wheels, said hitch being disposed off-center from said floor centerline.

8. The mixing apparatus of claim 7, further comprising a discharge opening in said wall.

9. A mixing apparatus for mixing livestock feed, said apparatus comprising:
  a container configured to be pulled in a direction of travel and to receive feed;
  said container including:
    a floor,
    a wall extending away from said floor, such that substantially all of said wall is disposed above said floor, said wall defining a top opening disposed remote from said floor for the reception therethrough of the feed, said floor and said wall defining therebetween an enclosure for the feed received through the opening;
    a discharge opening in said wall; and
    an auger disposed within said enclosure, said auger having an axis of rotation extending substantially vertically through the floor,
    said wall further including a first end and a second end positioned on opposing sides of the enclosure,
    said wall further including a first side and a second side positioned on opposing sides of the enclosure, said first side and said second side being disposed substantially parallel to the direction of travel of the mixing apparatus,
    a first angle between said second side and said axis of rotation being greater than a second angle between said first side and said axis of rotations,
    wherein said discharge opening is located in said second side of said wall and adjacent to said floor.

10. The mixing apparatus of claim 9 wherein said first side is disposed substantially vertical relative to said floor.

11. The mixing apparatus of claim 9 wherein said first side and said second side are not symmetrical.

12. The mixing apparatus of claim 9, wherein an absolute value of a difference between the first and second angles comprises a range of 10 to 30 degrees.

13. The mixing apparatus of claim 12, wherein the range comprises 15 to 25 degrees.

14. The mixing apparatus of claim 9, wherein said discharge opening is in a position off-center in said second side.

15. The mixing apparatus of claim 14 wherein said discharge opening is adjacent to said first end.

16. The mixing apparatus of claim 9, wherein said first side is disposed vertical relative to said floor.

17. The mixing apparatus of claim 9, wherein said first side and said second side are disposed parallel to a direction of travel of the mixing apparatus.

18. A mixing apparatus for mixing livestock feed, said apparatus comprising:
  a container for the reception of feed;
  said container including:
    a floor,
    a wall extending away from said floor, such that substantially all of said wall is disposed above said floor, said wall defining a top opening disposed remote from said floor for the reception therethrough of the feed, said floor and said wall defining therebetween an enclosure for the feed received through the opening; and
    an auger disposed within said enclosure, said auger having an axis of rotation extending substantially vertically through the floor,
    said wall further including a first end and a second end positioned on opposing sides of the enclosure,
    said wall further including a first side and a second side positioned on opposing sides of the enclosure,
    a first angle between said second side and said axis of rotation being greater than a second angle between said first side and said axis of rotation,
  the mixing apparatus further comprising an undercarriage disposed adjacent and underneath said floor,
  said undercarriage including;
    a hitch,
    a set of wheels,
    a floor centerline parallel to a direction of travel of said wheels,
    said hitch being disposed off-center from said floor centerline.

19. A mixing apparatus for mixing livestock feed, said apparatus comprising:
  a container configured to receive feed and configured to be pulled in a direction of travel;
  said container including:
    a floor,
    a wall extending away from said floor, such that substantially all of said wall is disposed above said floor, said wall defining a top opening disposed remote from said floor for the reception therethrough of the feed, said floor and said wall defining therebetween an enclosure for the feed received through the opening;
    an auger disposed within said enclosure, said auger having an axis of rotation extending substantially vertically through the floor,
    said wall further including a first side and a second side positioned on opposing sides of the enclosure,
  a distance between said axis of rotation and an upper part of said first side of said wall being shorter than a distance between said axis of rotation and an upper part of said second side of said wall as viewed from the direction of travel, and the mixing apparatus further comprising an undercarriage disposed adjacent and underneath said floor, said undercarriage including:
  a hitch,
  a set of wheels,
  a floor centerline parallel to a direction of travel of said wheels,
said hitch being disposed off-center from said floor centerline.

* * * * *